Nov. 6, 1956     L. P. BARKER, JR     2,769,175
CRADLE CLIP FOR SAFETY HATS
Filed April 19, 1954
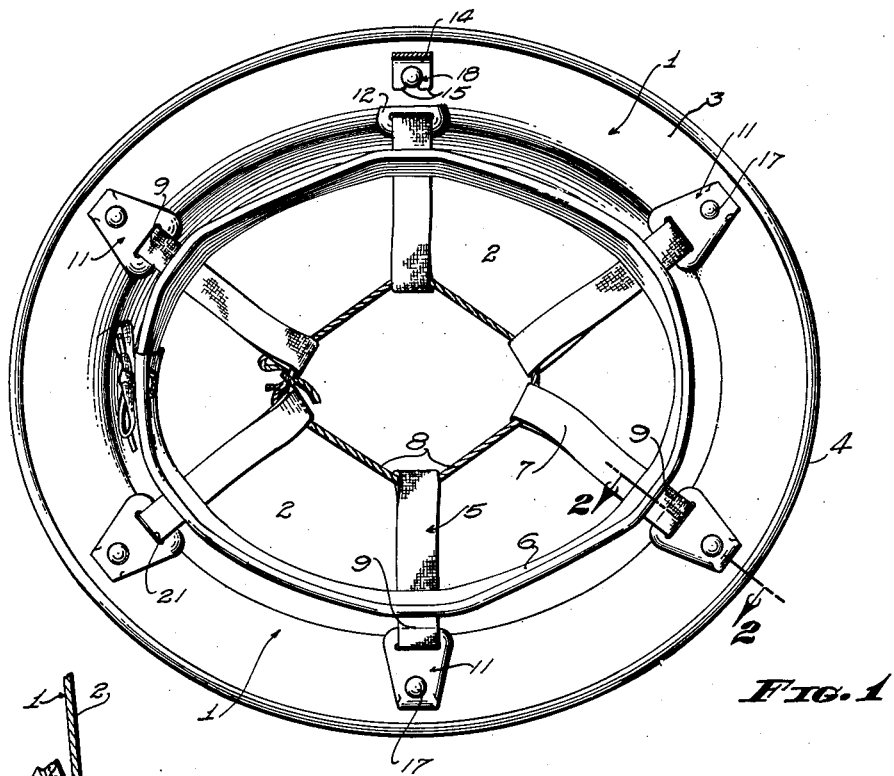
FIG. 1
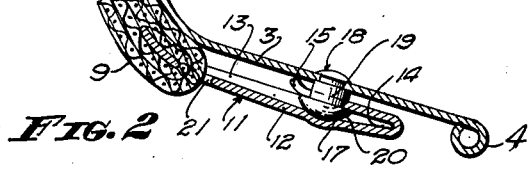
FIG. 2
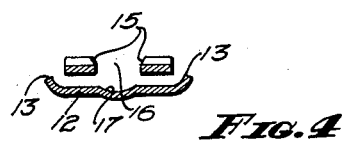
FIG. 4
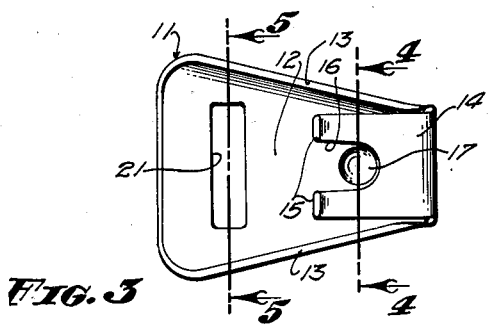
FIG. 3
FIG. 5
INVENTOR.
LUTHER PAUL BARKER JR.
BY
ATTORNEYS

2,769,175
CRADLE CLIP FOR SAFETY HATS

Luther Paul Barker, Jr., Pacific Palisades, Calif.

Application April 19, 1954, Serial No. 424,084

1 Claim. (Cl. 2—3)

My invention relates to cradle clips for safety hats, and included in the objects of my invention are:

First, to provide a cradle clip adapted for attachment to the extremities of the radiating webs of a safety hat cradle and are readily attached to or detached from mounting elements provided on the rim of a safety hat.

Second, to provide a cradle clip which though readily attachable and detachable when desired remains securely in position during use and is particularly dependable, not only over long periods of normal use but also in the event of a blow or impact against the safety hat.

Third, to provide a cradle clip for safety hats which although lying close to the under surface of the hat brim is, however, spaced therefrom and is supported in part by an attachment rivet and in part by the webbing of the hat cradle so that the cradle clip cannot mar the surface of the safety hat.

Fourth, to provide a cradle clip of this type which is capable of pivotal movement about the axis of the attachment rivet so that the cradle web may pull radially with respect to the axis of the rivet.

Fifth, to provide a cradle clip of this type wherein the gripping force is not dependent upon the spacing of the rivet head from the hat brim but is dependent solely upon the construction of the clip itself.

With the above and other objects in view, as may appear hereinafter, reference is directed to the accompanying drawings, in which:

Figure 1 is a bottom view of a safety hat incorporating my safety hat cradle clip;

Fig. 2 is an enlarged fragmentary sectional view through 2—2 of Fig. 1, showing the manner in which the cradle clip is attached to the safety hat;

Fig. 3 is a plan view of the normally upper side of the cradle clip which confronts the hat brim;

Fig. 4 is a transverse sectional view thereof, through 4—4 of Fig. 3; and

Fig. 5 is a transverse sectional view through 5—5 of Fig. 3.

Safety hats of the type employing my cradle clip are formed of metal or laminated plastic capable of resisting impact. Such safety hats designated 1 include a crown 2 large enough to encompass the head and be spaced therefrom, and a brim 3 usually having a rolled margin 4. It is conventional in the construction of such hats to provide a cradle structure 5 which comprises a headband 6 to which is attached several radiating cradle straps 7. The radially inner extremities of the cradle straps are joined by a tie cord 8. The radially outer extremities of the cradle straps are provided with loops 9, which are secured to the brim of the hat by means of a cradle clip and rivet or other attaching device.

My cradle clip designated 11 is substituted for the conventional cradle clip. My special cradle clip comprises a plate portion 12 having converging and curved transversely side margins 13. At the narrower end the plate portion 12 is provided with a folded tongue 14 which overlies the plate portion and terminates in a forked end 15, forming a notch 16. The plate portion is provided at a point in alignment with the notch 16 with a depression 17.

My special cradle clip is employed in conjunction with a rivet 18, or other fastening device, attached to the under side of the brim 3 of the safety hat. The rivet 18 includes a short stem 19 and rounded head 20, forming with the stem a shoulder. The forked end of the folded tongue 14 is adapted to straddle the stem 19 so that the head 20 is retained between the folded tongue 14 and the plate portion 12. The cradle clip is formed of spring material so that the cradle clip may be snapped into position on the rivet 18 and be retained thereon against accidental dislodgment. The larger end of the plate portion 12, remote from the folded tongue 14, is curved to conform approximately to the curved juncture between the crown 2 and brim 3 of the safety hat. Adjacent this end the plate portion 12 is provided with a slot 21 adapted to receive the looped end 9 of a corresponding cradle strap 7.

It will be observed that tensile loads applied to the cradle straps are resisted by the plate portion 12 and folded tongue 14, and is in a direction in which the forked end 15 moves toward rather than away from the rivet 18. It will also be noted that the cradle clip 11 is supported entirely by the rivet 18 and by that portion of the loop 9 lying between the plate portion 12 and the safety hat. Still further, it will be observed that the cradle clip 11 is capable of pivoting about the axis of the rivet 18 so as to ensure alignment of the cradle clip along a radius line passing through the cradle strap and the axis of the rivet 18.

Although the cradle clip is firmly held in place against accidental dislodgment or against dislodgment by reason of any sudden tensile load applied to the cradle structure, as might occur when the safety hat resists a blow, the cradle clip is nevertheless easily removed manually by pressing radially outward with respect to the safety hat. Conversely, the cradle clip may be readily and quickly attached to the hat. Thus, the entire cradle structure may be easily installed, or removed for adjustment or cleaning, with a minimum of difficulty.

Having fully described my invention, it is to be understood that I do not wish to be limited to the details herein set forth but my invention is of the full scope of the appended claim.

I claim:

In a safety hat having a crown flaring outwardly to form a rim, a ring of attachment elements secured to and depending from said rim, said elements including stem portions terminating in buttons spaced from said rim, and a cradle including a headband and radiating straps, a cradle clip for connecting each strap to a corresponding button, each cradle clip comprising: a plate member having a larger end and a smaller end, the side margins of said plate member being bent from the plane of said plate member to form stiffening elements, the larger end of said plate being curved in general conformity with the hat in the region of the juncture between the crown and rim, and slotted to receive the end of a radiating strap, a portion of said strap being interposed between the larger end of said plate member and said hat to form a pad spacing the larger end of the plate member from contact with the hat, the smaller end of said plate member being folded under said plate member and bifurcated to form a forked tongue straddling said stem, the normal spacing between said forked tongue and said plate member being less than the thickness of the button, whereby said button is gripped between said tongue and plate member to hold said tongue and plate spaced from said rim, said plate member having a recess therein located to receive the extremity of said button to retain said plate member thereon.

References Cited in the file of this patent

UNITED STATES PATENTS

| | | |
|---|---|---|
| 666,914 | Wilson | Jan. 29, 1901 |
| 2,415,214 | Lewis | Feb. 4, 1947 |
| 2,536,467 | Ruggiero | Jan. 2, 1951 |